United States Patent
Goodrich (12) 
(10) Patent No.: US 6,172,335 B1
(45) Date of Patent: Jan. 9, 2001

(54) CARPET SEAMING IRON WITH ELECTRONIC TEMPERATURE CONTROL

(75) Inventor: Gary Goodrich, Union City, CA (US)

(73) Assignee: Orcon Corporation, Union City, CA (US)

(*) Notice: Under 35 U.S.C. 154(b), the term of this patent shall be extended for 0 days.

(21) Appl. No.: 09/384,662

(22) Filed: Aug. 27, 1999

(51) Int. Cl.[7] .................................................. D06F 75/26
(52) U.S. Cl. ........................ 219/251; 219/245; 156/579; 38/95; 38/82
(58) Field of Search ................................ 219/251, 252, 219/253, 245, 254, 228, 231, 249, 485, 494, 497; 156/579; 38/74, 81–82, 88, 92–93, 95

(56) References Cited

U.S. PATENT DOCUMENTS

| | | |
|---|---|---|
| 4,322,900 | 4/1982 | Hacker et al. . |
| 4,347,428 * | 8/1982 | Conrad et al. ...................... 219/251 |
| 4,438,323 * | 3/1984 | Milnes ................................ 219/254 |
| 4,536,244 | 8/1985 | Greci et al. . |
| 4,580,038 | 4/1986 | O'Loughlin . |
| 4,827,104 | 5/1989 | Foster, Jr. . |
| 4,897,527 * | 1/1990 | Cripps et al. ...................... 219/252 |
| 5,039,838 * | 8/1991 | Ito et al. ............................ 219/251 |
| 5,294,284 * | 3/1994 | Papulski ............................ 219/245 |
| 5,333,401 * | 8/1994 | Klein .................................... 38/95 |
| 5,345,055 | 9/1994 | Leung . |
| 5,476,137 | 12/1995 | Ochiai . |
| 5,819,845 | 10/1998 | Ryu et al. . |
| 5,944,943 | 8/1999 | Kwok et al. . |

FOREIGN PATENT DOCUMENTS

| | | | |
|---|---|---|---|
| 2944242 * | 5/1981 | (DE) | ..................... 219/251 |
| 1068419 * | 5/1967 | (GB) | ..................... 219/251 |
| 2-136198 * | 5/1990 | (JP) | ..................... 219/252 |
| 3-77592 * | 4/1991 | (JP) | . |
| 3-159698 * | 7/1991 | (JP) | ..................... 219/252 |
| 4-122392 * | 4/1992 | (JP) | ..................... 219/251 |
| 4-285600 * | 10/1992 | (JP) | ..................... 219/251 |
| 4-319397 * | 11/1992 | (JP) | ..................... 219/251 |
| 4-354982 * | 12/1992 | (JP) | ..................... 219/251 |
| 5-305199 * | 11/1993 | (JP) | ..................... 219/252 |

* cited by examiner

Primary Examiner—John A. Jeffery
(74) Attorney, Agent, or Firm—O'Melveny & Myers LLP (57) ABSTRACT

A carpet seaming iron having an internal electronic temperature control circuit including a solid state temperature sensor, a power controller, and a solid state switching device is disclosed. The iron does not use a thermostat for temperature control. The iron includes a baseplate, an electrically powered heating element, a heat shield, a handle and the internally mounted control circuit. The control circuit includes a means for providing a signal to the power controller corresponding to a desired temperature of the iron. A solid state temperature sensor sends a signal to the power controller corresponding to the baseplate temperature. The power controller controls the switching device so that the amount of power supplied to the heating element is proportional to the difference between the baseplate temperature and the desired temperature. Thus as the baseplate becomes hotter, less power is supplied to the heating element, and the seaming iron maintains a stable and precise temperature.

13 Claims, 5 Drawing Sheets

FIG. 8

CARPET SEAMING IRON WITH ELECTRONIC TEMPERATURE CONTROL

BACKGROUND OF THE INVENTION

1. Field of the Invention

The invention relates to electric heating irons used for melting hot-melt seaming tape during installation of wall-to-wall carpeting, and more particularly to the method of temperature control for such seaming irons.

2. Description of the Related Art

During the installation of wall-to-wall carpeting, often the area to be carpeted is wider than the carpet as produced by the carpet mill. Therefore, two or more pieces of carpet must be joined along a seam. Wall-to-wall carpet is usually seamed using hot-melt carpet seaming tape. Carpet seaming tapes typically include a layer of thermoplastic (hot-melt) resin adhesive for bonding to the adjoining pieces of carpet. To form a seam using the face-seaming process, the two pieces of carpet to be seamed are placed with the tufts facing up and edges abutting over a length of seaming tape. The seaming tape is centered under the two abutting edges with the layer of adhesive facing the carpet backing. A hot carpet seaming iron, or other suitable implement, is used to melt the thermoplastic adhesive and the carpet backing is pushed into the molten thermoplastic adhesive. The adhesive quickly sets, forming a permanent seam. This method is disclosed by, e.g., U.S. Pat. Nos. 3,972,768, 4,097,445 and 4,536,244.

Various carpet seaming irons are commercially available from several sources. All employ similar design elements: a relatively thin, thermally insulated heating platen, an electrically powered heating element, a handle, and an electric circuit incorporating a thermostat for temperature control. Such irons are disclosed by, e.g., U.S. Pat. No. 4,536,244. The iron platen must be thin to allow the platen to fit readily underneath the two piece of carpeting. The electric power must also be relatively high (typically, irons consume about 800 Watts of power) so that the iron heats up quickly and maintains its temperature. Otherwise, the iron will not melt the carpet seaming tape quickly enough for the typical operator.

The combination of a thin platen, high power, and thermostatic control has several disadvantages. Thermostats are prone to react too slowly to temperature changes. A high-powered, low mass iron heats up so quickly that the thermostat will not shut off the power to the heater in time. That is, the iron "overshoots" the desired temperature. The platen will become hotter than desired, which can damage the carpet or seaming tape, and shorten the life of the iron. Excessive smoke can be produced when the seaming tape adhesive is overheated. After the thermostat shuts off power, the thin platen cools rapidly. Again, the thermostat reacts too slowly. The iron becomes too cool for the operator to work rapidly. The thermostat then activates the electric heater, and the iron begins heating again, repeating the cycle. The iron cycles repeatedly between a temperature that is too hot and a temperature that is too cool. The thermostat is unable to maintain a steady iron temperature.

A further disadvantage of thermostatic control is that the full power of the heater is switched through the contacts of the thermostat. After many cycles, the contacts can fuse in a permanently closed position. The iron heater will remain permanently on and can overheat dangerously.

A still further disadvantage of thermostatic control is that many commonly available thermostats do not consistently control within the same range of temperature. For example, a given thermostat may control in a range between 350° F. and 420° F. Another thermostat from the same manufacturing lot may control in a range between 370° F. and 440° F. Consequently, the seaming irons do not perform consistently. One may run relatively cool, while another runs relatively hot.

SUMMARY OF THE PRESENT INVENTION

My invention utilizes an solid-state electronic control circuit with a proportional control loop to control the temperature of a seaming iron. The resulting temperature control is more stable, consistent, and reliable than a thermostat can provide. Proportional (P) control loops, proportional-integral (PI) loops, and proportional-integral-derivative (PID) loops are well known means of temperature control. Many examples of electronic circuits implementing P, PI, and PID control are known in the art and in heating appliances generally. My electronic control circuit uses no thermostats or other mechanical control devices for temperature control, thereby avoiding the disadvantages of such devices.

However, no one has included any electronic circuit with P, PI, or PID control into the handle of a carpet seaming iron. It is too hot inside the handle of prior art carpet seaming irons for many electronic components, such as integrated circuits. Furthermore, the platen (also called the baseplate or soleplate) of industrial irons such as carpet seaming irons is hotter than mass-produced heating irons for home use. Therefore, the carpet seaming irons could not make use of the same solid state temperature sensors as the consumer products. Special high-temperature components are too expensive to be commercially feasible in the price-sensitive market for seaming irons. Some prior art irons, such as disclosed by U.S. Pat. No. 4,322,900 (Hacker, et al, 1982) and U.S. Pat. No. 4,827,104 (Foster, Jr., 1989), put portions of the electronic control circuit outside of the handle, in a separate enclosure. These irons are relatively bulky and inconvenient to use.

My invention makes it possible to put low-cost electronic components providing P, PI, or PID control inside the handle of a carpet seaming iron, and makes use of newly available, low-cost solid state temperature sensors mounted directly to the iron platen. The result is that carpet installers can now benefit from the advantages of electronic control conveniently and inexpensively.

OBJECTS AND ADVANTAGES

The object of my invention is to provide a carpet seaming iron that heats to the desired temperature setpoint quickly. This will enable a carpet installer to begin using the iron more quickly, without waiting for it to heat up.

A further object is for the iron to maintain its temperature at the setpoint during use, without temperature fluctuations. Maintaining a steady temperature will provide consistent operation of the iron at all times during the installation process. Unlike with a thermostatically controlled iron, the carpet installer will not have to adjust his pace of work as the iron heats up and cools down.

A further object of my invention is to provide solid state switching for the electric heater. This will eliminate wear that occurs with the physical contacts of a thermostatically controlled iron, leading to a longer life. In addition, the possibility that the switch will become stuck in the "closed" (heating) position is much less likely, making my iron safer than thermostatically controlled irons.

A still further object of my invention is to provide an iron with inherently more consistent and repeatable temperature control means by eliminating mechanical devices and using only solid state devices for temperature sensing, power switching, and control. Irons made with my invention are more likely to perform within the same range of temperatures from unit to unit. Operators switching from one unit to another are less likely to notice any difference in performance of my irons.

DESCRIPTION OF PREFERRED EMBODIMENTS

Structure

A. Mechanical Components

An improved carpet seaming iron of the present invention is shown in FIGS. 1–5. A carpet seaming iron of the present invention is used for conventional face seaming of carpets to produce, for example, wall-to-wall carpeting installations. Face seaming is explained in more detail in U.S. Pat. No. 4,536,244 to Greci et al., which is incorporated herein by reference. Except for the means of temperature control, many mechanical components and features of my iron are described in allowed U.S. PATENT Application Ser. No. 09/014,531 filed on Jan. 28, 1998, new U.S. Pat. No. 9,944,943 which is incorporated herein by reference.

Figure 1:
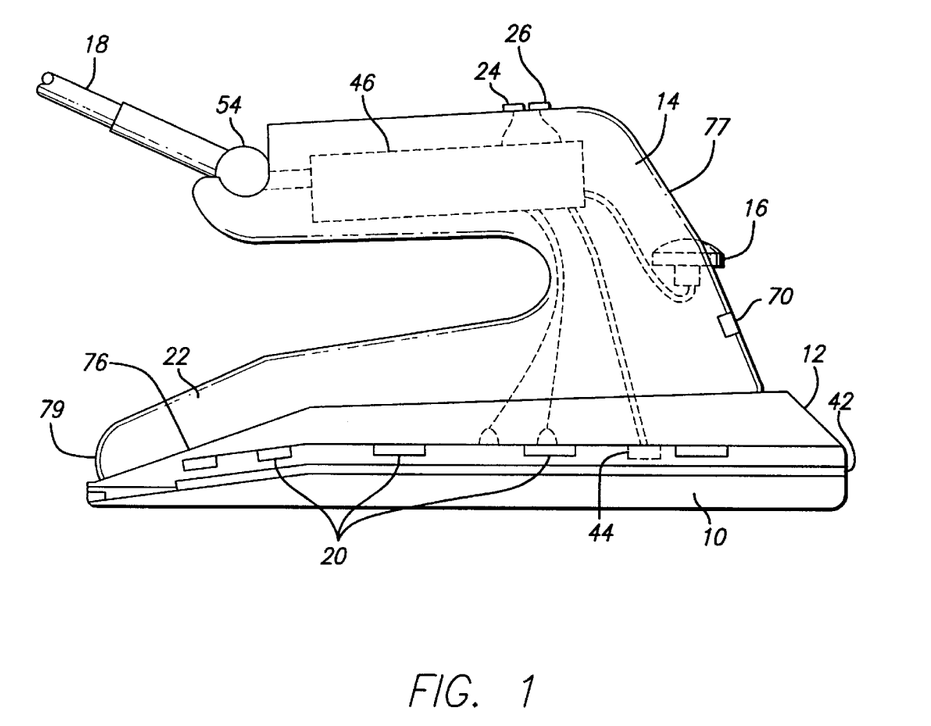
FIG. 1 is a side view of a carpet seaming iron with my electronic temperature control.

As shown in FIG. 1, an iron of the present invention includes a baseplate 10. Baseplate 10 is typically constructed from any durable material which demonstrates relatively high conductivity of heat and which has a melting point well above the normal range of temperatures at which an iron of this invention will operate. Aluminum is preferred because of its high conductivity, low cost, availability, and ease of forming into the desired shape.

Figure 2:
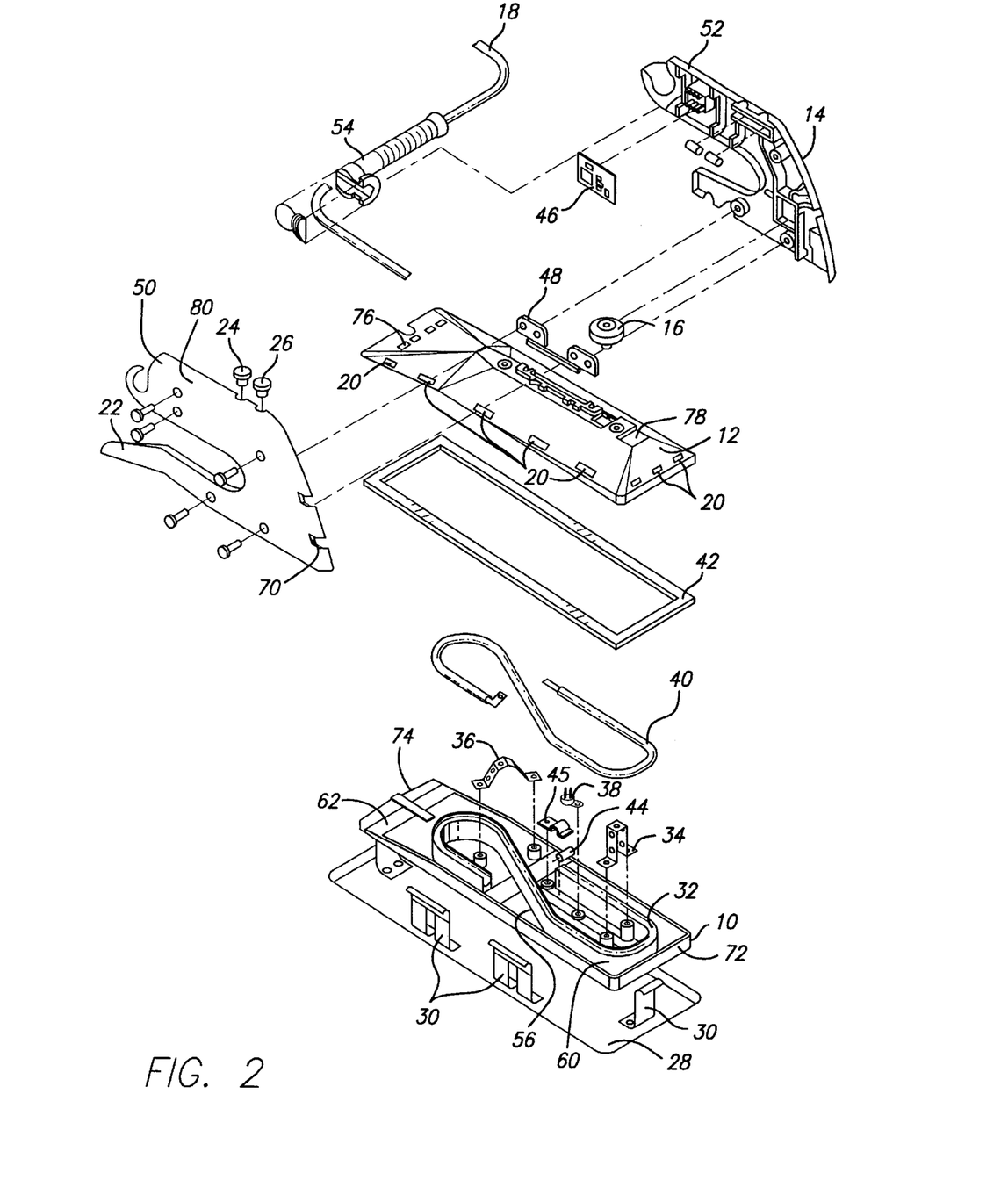
FIG. 2 is an exploded perspective view of a carpet seaming iron with my electronic control.
Figure 3:
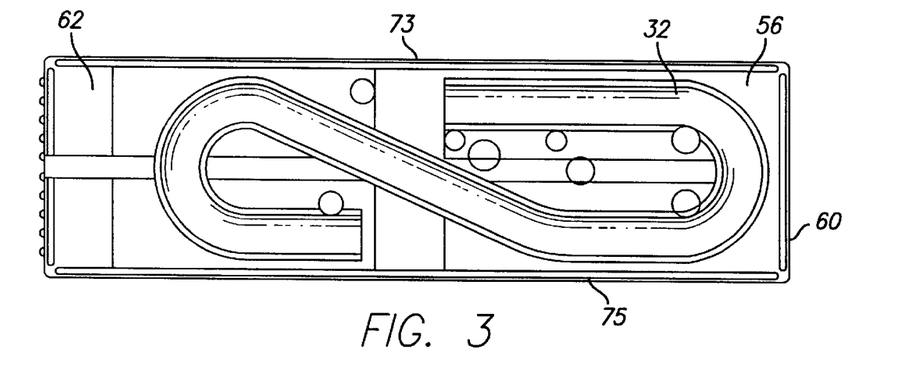
FIG. 3 is a top view of a baseplate suitable for a carpet seaming iron with my electronic temperature control.
Figures 4, 5:
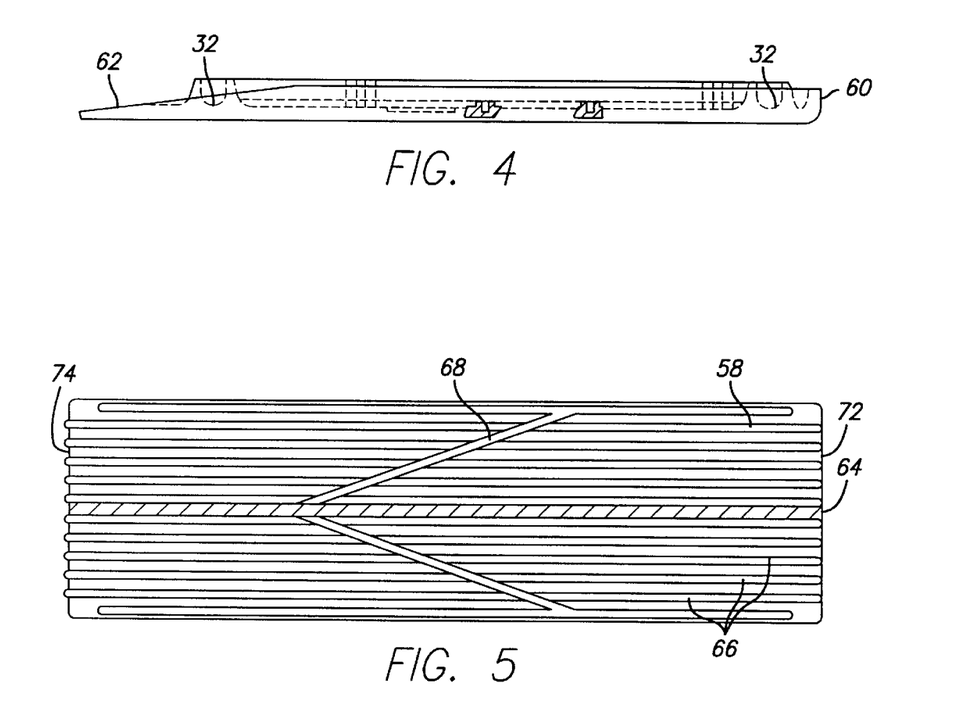
FIG. 4 is a side view of a baseplate suitable for a carpet seaming iron with my electronic temperature control.
FIG. 5 is a view of the bottom of a baseplate suitable for a carpet seaming iron with my electronic temperature control.

As shown in FIGS. 2–5, baseplate 10 has a top surface 56 and a bottom surface 58. The bottom surface 58 is for contacting and melting the hot melt adhesive layer on a strip of conventional hot melt carpet seaming tape. To prevent sticking, bottom surface 58 may be coated with any conventional no-stick coating, such as those used in conjunction with cooking utensils. As shown in FIG. 5, bottom surface 58 is preferably provided with a plurality of parallel ribs 66 extending from the leading edge 72 to the trailing edge 74. Parallel ribs 66 form a series of grooves for channeling the molten hot melt adhesive. A deep center groove 64 is preferably provided to form a raised center bead of molten adhesive for coating the abutting edges of carpet being seamed. In addition, a 'V' groove 68 for feeding molten hot melt adhesive into the deep center groove 64 is also preferred. Bottom surface 58 could be shaped differently so long as the shape is suitable for melting hot melt adhesive for the face seaming of carpets.

As shown in FIGS. 2–4, top surface 56 is provided with a raised channel 32 for encasing a heating element 40. Top surface 56 also includes fastening means such as the preferred threaded sockets shown in FIG. 2 for receiving screws or other threaded fasteners. Heating element 40 may be cast integrally with channel 32, or may be a separate removable piece, depending on cost and manufacturing considerations.

A peripheral wall 60 is preferably provided extending up from the top surface 56 and around the periphery of baseplate 10. Peripheral wall 60 preferably extends around at least the leading edge 72, a first side 73 and a second side 75 of baseplate 10. To keep the profile of the baseplate low at its trailing edge 76, I prefer to omit the peripheral wall there. Peripheral wall 60 provides a sealing surface for insulating gasket 42.

Channel 32 extends above the top surface 56 for conducting heat from heating element 40 to baseplate 10. By improving heat conduction and reducing heat loss, the use of channel 32 to encase heating element 40 enables baseplate 10 to be substantially lighter than in conventional carpet seaming irons. Better heat conduction can be achieved by ensuring that the walls of channel 32 are sufficiently thick. For the same reason, I prefer to make channel 32 integral with the top portion 56 of baseplate 10. This can easily be achieved by casting the baseplate 10 with the channel 32 in a single piece. Less preferably, baseplate 10 and channel 32 may be machined from a single piece of metal.

Heat loss from element 40 is controlled by covering the top surface of channel 32 with an insulating material. Such insulating material can include any substantially nonconductive insulation such as, for example, insulating paper, asbestos, heat resistant plastics and resins, or ceramic materials, or poor conductors such as steel foil.

As shown in more detail in FIG. 4, the top edge of the walls forming channel 32 preferably extends above both the top surface 56 and the peripheral wall 60. This enables the production of a carpet seaming iron that is very light weight (reduced thermal mass) in comparison with conventional carpet seaming irons. A low thermal mass is preferable because it allows my iron to heat and cool more quickly than conventional seaming irons. The reduced mass also makes my iron lighter and easier to handle, and reduces the cost of manufacturing. However, the control system for my iron will provide advantages irrespective of the mass of the baseplate, and a conventional baseplate may be used in my iron.

As shown in FIGS. 1 and 2, a heat shield 12 is mounted over baseplate 10. The purpose of heat shield 12 is to shield both the operator and the carpet from the temperatures generated at the top surface 56 of the baseplate. If the outer surface of heat shield 12 becomes too hot, carpet backings resting on the outer surface of the heat shield 12 can be damaged or degraded. In addition, a hot heat shield can present a safety hazard to the operator. Furthermore, a hot heat shield will heat up the handle of the iron, making it more difficult to place an electronic control circuit 46 in the handle. A warm handle also reduces operator comfort. Accordingly, heat shield 12 is most preferably formed from a material that is relatively nonconductive or a poor conductor of heat. While certain metals which are poor conductors, such as steel, can be used, I prefer using non-metallic materials, which are better insulators and lighter than metals. I prefer using fiber reinforced heat resistant resins, for example, polyphenylene sulfide resin reinforced with glass fibers (known as RYTON TM, from Phillips Petroleum Company), which provides much cooler surface temperatures than steel.

The heat shield 12 also preferably provides a usefully angled surface against which the carpet backing rests as the carpet seaming iron is being moved along a seam line to melt the underlying carpet seaming tape. I prefer to make heat shield 12 with a tapered trailing end 76. Tapered trailing end 76 forms a ramp inclining downwards in the trailing direction for guiding the overlying carpet down into the molten adhesive for forming the seam.

Heat shield 12 is mounted to the baseplate through connecting means 34 and 36 preferably using conventional threaded fasteners. Connecting means 34 and 36 are most preferably formed from relatively non-conductive or low conductive materials which will not easily transfer heat from the top surface 56 of baseplate 10 to heat shield 12. I prefer steel because of its strength, low cost and ready availability; however, other relatively poor conductors could also be used.

An insulating gasket 42 is also preferably mounted between the baseplate 10 and the heat shield 12 to prevent transmission of heat from the baseplate to the heat shield 12. Most preferably, insulating gasket is positioned on top of the peripheral wall 60 and along the trailing edge 74 to prevent any direct contact between the heat shield 12 and the top of the base plate 10. The insulating gasket 42 is preferably a relatively soft material (for forming a seal) that is also high-temperature resistant and a poor thermal conductor. I use a high temperature silicon rubber although other suitable materials are available.

I cool the heat shield 12 by providing one or more air inlets 20 about the periphery of the heat shield 12. Air inlets 12 allow air at room temperature to enter the space between the baseplate 10 and the heat shield 12. Openings 78 at the top, front end of the heat shield allow the heated air to rise and escape the space between the heat shield 12 and the baseplate 10. The hot air passes through a base portion of handle 14 and vents to the atmosphere at air outlet 70 in handle 14. Thus, heat shield 12 and handle 14 remain relatively cool during operation of the iron.

As shown in FIG. 2, control knob 16 is mounted in leading edge 77 of handle 14 so that it is easily accessible to the operator of the seaming iron. Control knob 16 is a manual adjustment means for adjusting iron's temperature setting. Other manual adjustment means, such as sliders, keypads, or push buttons may be substituted for knob 16. Knob 16 is electrically connected to a temperature set point adjusting means, such as a variable resistor or other adjustable electrical device for adjusting the desired temperature of the iron. By adjusting the control knob 16, the operator can adjust the desired temperature set point of the iron. The operator can therefore control the temperature of the baseplate through a range of temperatures.

A bracket 48 is mounted to the top of heat shield 12 for mounting a handle 14 over the top of the heat shield 12, as shown in FIG. 1. As shown in FIG. 2, handle 14 is preferably formed from a first handle half 50 and a second handle half 52. The handle halves 50 and 52 preferably include integral alignment and channel means for mounting the two handle halves together over bracket 48 using fastening means, such as the threaded fasteners shown. The handle 14 provides a convenient platform for mounting the iron controls, such as control knob 16 for which a port is provided in the front, leading part of the handle. The handle 14 also provides a conduit leading from openings 78 to outlet 70 in leading edge 77 of the handle, thus permitting warm air rising through openings 78 to escape to the outside.

A power cord 18 is also preferably provided for delivering electrical power through the control circuit 46 to the heating element 40. One end of the power cord 18 is preferably connected to the control circuit 46. The power cord is then routed through pre-formed conduits in the handle 14, and through a strain relief device 54, which preferably secures the cord in the end of the hand grip 80. I prefer using a strain relief device such as that described U.S. Pat. No. 5,821,458 (Wenzel, 1998) which is incorporated herein by reference.

First handle half 50 also preferably includes a relatively thin guide 22. Guide 22 is positioned towards the trailing edge 79 of handle 14, and tapers down over the inclined surface 76 of heat shield 12 towards the trailing edge 74 of base plate 10. Guide 22 helps to align the carpet seaming iron relative to the two carpet edges being seamed. It also helps center those edges over the deep center groove 64, so that the edges will be coated by the bead formed by the deep center groove as the edges are pushed together.

As shown in FIG. 2, a stand 28 can be provided for resting a heated iron when the operator is required to perform other tasks. Stand 28 includes spring-type clips 30 that preferably secure the iron above the stand 28. Stand 28 can be made from any durable, heat resistant material; however, a material which is a poor conductor of heat, such as steel or a heat resistant plastic or resin, is preferred.

B. Electrical Components and Theory of Operation

Various electrical components are used in my iron, including primarily a heating element 40, a solid-state temperature sensor 44, thermal fuse 38, a solid state power switching device which is preferably a triac 47, indicator lamps 24, and 26, and control circuit 46, which incorporates many smaller components.

Heating element 40 is preferably a cartridge heater with a tubular steel sheath encasing a nichrome resistance wire, and with magnesium oxide insulation between the sheath and the wire. The steel sheath is typically circular in cross section and about one-quarter (0.25) inches in diameter. Other types and shapes of heating elements may offer advantages, but I have found tubular heaters to be best overall for carpet irons because of their low cost and reliability.

Heating element 40 is preferably selected for appropriate power consumption at the anticipated supply voltage. My iron requires about 400 watts to about 650 watts, and most preferably at about 550 watts, for optimum seaming. This power level allows the heating element to remain under power while maintaining temperature hot enough to melt the seaming tape adhesive without scorching when seaming continuously at a rate of about 2.5 to 3.0 feet per minute using a good quality seaming tape. The most highly skilled carpet installers do not seam faster than about 3.0 feet per minute because of physical limitations. Conventional carpet seaming irons with a more massive baseplate than my iron typically require about 40% more power to heat as rapidly as desired.

A thermal safety device such as thermal fuse 38 is preferably placed between the control circuit 46 and the heating element 40 for shutting down the iron in case of failure of the temperature control circuit 46. It is preferable to mount thermal fuse 38 directly to baseplate 10 for fastest temperature response. If for any reason the seaming iron becomes too hot (as for example in case of failure of the control circuit 46), thermal fuse 38 opens, and remains permanently open, cutting off all electric power to the iron.

Preferably, thermal fuse 38 can be a fusible link or any other compact, non-cycling, high temperature, independently operating device. Cycling thermal safety devices such as ceramic disc thermostats are less desirable. Cycling devices are capable of operating the power circuit independently through many cycles, potentially concealing problems with the iron's power control circuit 46. The advantage of a cycling device is than the iron can be used immediately after a transient over-temperature condition has passed. In the case of a non-cycling device, the iron must be disassembled and the thermal fuse replaced after an over-temperature condition. In a conventional, thermostatically controlled iron, over-temperature conditions can occur somewhat frequently under some operating conditions. Therefore, for thermostatically controlled irons, a non-cycling device is less desirable. However, the design of my iron ensures that over-temperature conditions will be rare and will not occur unless there is a serious failure of the temperature control circuit. Therefore, a non-cycling device is preferred.

Figure 9:
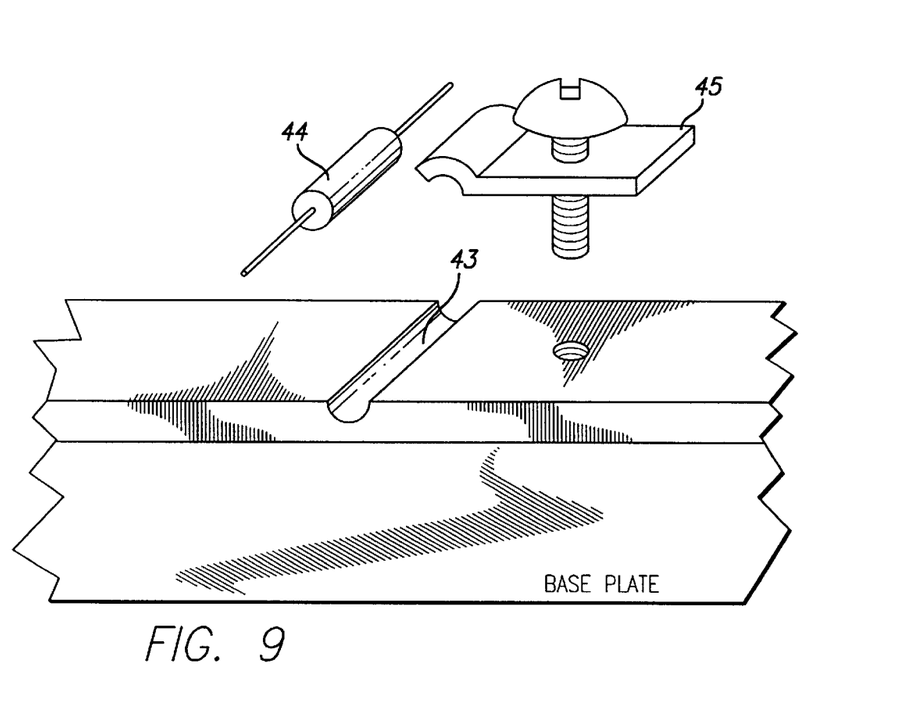
FIG. 9 is a perspective view showing details for mounting a solid state temperature sensor to the baseplate of a seaming iron.

Temperature sensor 44 is a solid state device such as a resistive temperature detector (RTD), thermistor or thermocouple, capable of generating an electronic output signal proportional to temperature for the electronic control circuit 46. Temperature sensor 44 is mounted to the top surface 56 of baseplate 10. I prefer to mount temperature sensor 44 in a recess 43 in baseplate 10, as shown in FIG. 9, using bracket 45 secured by a threaded fastener. I also prefer to coat the sensor 44 with a non-electrically conductive heat transfer paste. These measures for mounting the sensor 44 help ensure reliable operation of the iron and consistent performance between different irons of the same design.

An operator turns on my iron by plugging the end of power cord 18 into an appropriate electrical receptacle. The iron is turned off by unplugging the power cord. It is possible to incorporate a mechanical switch into my iron so that it can be turned on and off while remaining connected to an electrical receptacle. However, to improve the ruggedness and reliability of the iron, I prefer to omit a mechanical on-off switch. Typically, a carpet installer will plug in his iron when he is ready to begin working, and will unplug it when he is finished, so an on-off switch would provide little or no added convenience.

Two indicator lamps 24, 26 are preferably provided. One indicator lamp 24 remains lighted during the entire time the iron is connected to power (e.g., so long as electric power is being delivered to the control circuit 46). The other lamp 26 is lighted whenever the control circuit 46 determines the temperature of the baseplate 10 is cooler than the preset, desired temperature and power to the heater element 40 is on. Once the desired temperature is achieved, power to the heating element 40 is discontinued and lamp 26 turns off. Of course, the function of lamp 24 and 26 could be alternated.

Conventional means of temperature control for carpet seaming irons have relied without exception on bimetallic thermostats or equivalent mechanical devices. When the required temperature is reached, the thermostat cuts off the power supply. When the operating temperature drops below the cut-off point, power is switched back on. Because of the delay in response that all thermostats have, the operating temperature of the iron is not steady, but ripples up and down. Use of a thermostatic control system in a fast heating carpet seaming iron results in temperature overshoot, which can damage the unit and degrade performance.

Figure 6:
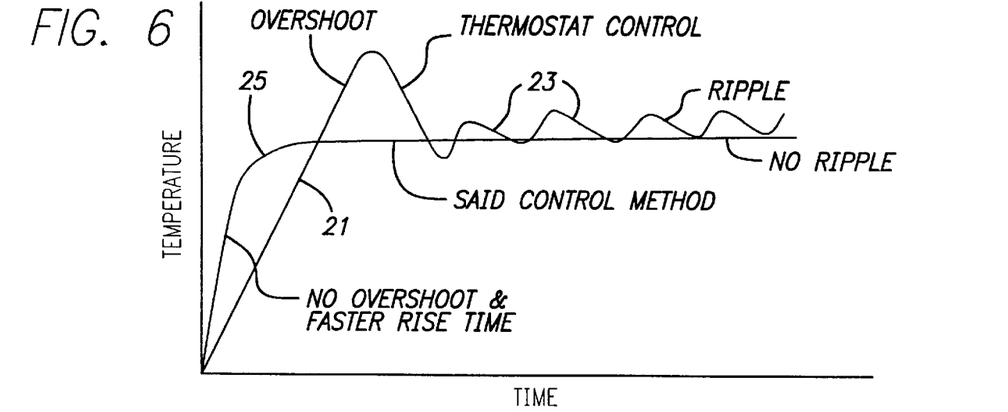
FIG. 6 is a temperature chart illustrating some of the advantages of using my electronic controller for a carpet seaming iron.

This overshoot is shown graphically in FIG. 6 in which temperature is plotted against time. Curve 21 shows the temperature response of a typical prior art seaming iron. When the iron is first turned on, its temperature overshoots the desired set point indicated by the horizontal portion of curve 25. The temperature of the iron then ripples 23 up and down around the desired set point and will never settle down. Typically, for prior art seaming irons the difference between the peaks and troughs of ripples 23 is about 50° F. for a set point of about 375° F. By contrast, with my iron and control circuit, the iron heats more rapidly initially and has essentially no ripple, as shown schematically by curve 25. Thus my seaming iron with electronic temperature control is the first carpet seaming iron to combine the rapid response of a lightweight baseplate and optimal power consumption with the temperature stability obtainable by electronic means.

My control circuit 46 is preferably on a printed circuit board preferably positioned within handle 14. It initially delivers full electrical power to the heating element 40. As the temperature rises, the circuit gradually decreases the amount of power supplied, thus avoiding overshoot. When the temperature reaches the desired point, just enough power is delivered by the control circuit to maintain the temperature, and so ripples 23 are avoided. My iron is optimized to heat rapidly when in contact with cold (room temperature) adhesive tape, and thus may overshoot its desired temperature when heating in air. However, the amount of overshoot in air is less than with conventional irons, and does not cause problems in practice.

Figure 7:
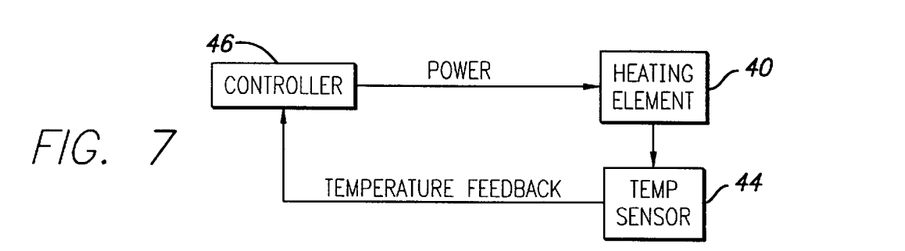
FIG. 7 is a block diagram showing how the electronic control works in principle.

FIG. 7 is a block diagram showing my system for controlling temperature. The control circuit 46 controls electrical power to heating element 40. The resulting temperature of the baseplate 10 of the seaming iron 15 is sensed by temperature sensor 44, and a temperature signal is fed back to the control circuit. The control circuit controls the amount of power that goes to the heating element, preferably by sending a control signal to a phase-sensitive switching means (such as zero voltage switching) for alternating current (AC) power. A smaller portion of the power phase is utilized for power as the temperature rises, thus providing less heat energy as the temperature rises. Therefore, the temperature stabilizes at the desired set point.

The control signal used for power switching is preferably proportional to the error signal, which is the difference between the signal from the temperature setting means (representing the desired temperature set point) and signal from the temperature sensor (measuring the baseplate temperature). This is known as P control. For my iron, P control with a proportional band of about ten is preferable. For better control of temperature overshoot, the control signal may be made to additionally include a component that is proportional to the time integral of the error signal. This is referred to as PI control. For a more rapid initial response without overshoot, the control signal may additionally include a component that is proportional to the rate of change (the "derivative") of the error signal. This is referred to as PID control. Simple proportional control is adequate for purposes of controlling my carpet seaming iron, although some improvement in control may be realized by using PI or PID control.

C. Electronic Control Circuit

Figure 8:
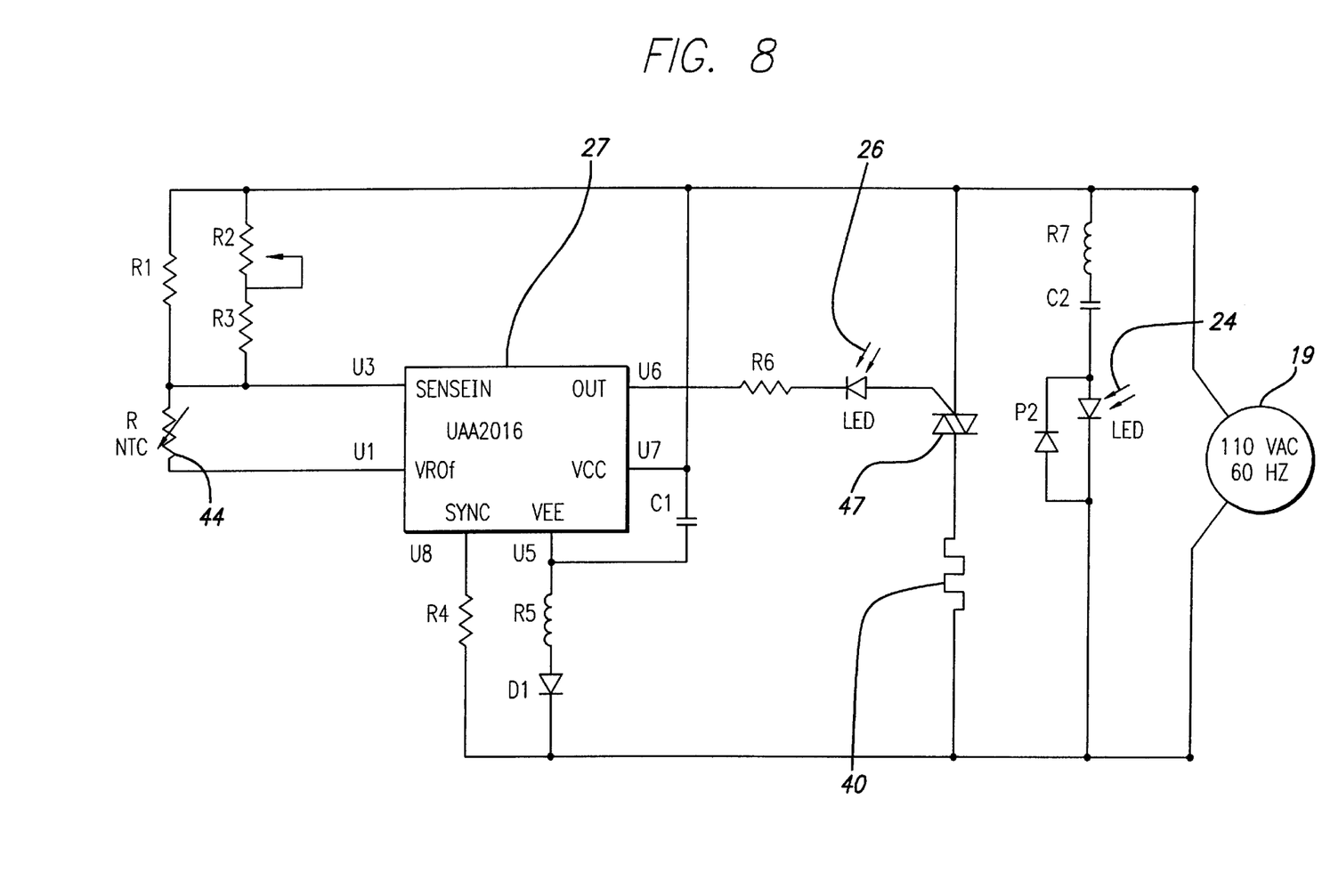
FIG. 8 is a circuit diagram for an electric circuit to provide my electronic temperature control to a seaming iron.

FIG. 8 is an electrical diagram of one embodiment of my control circuit 46. This circuit is designed to operate on 60 Hz, 120 VAC power as commonly found in the United States. It can easily be adapted by one of ordinary skill in the electronic arts to function with different power supplies. The circuit controls power using a power controller chip 27 available as UAA2016 zero voltage switch power controller from Motorola, Inc. Various other similar chips are commercially available for use as power controllers, and could be identified by a circuit designer of ordinary skill.

Power for heating element 40 comes from power input 19, through power switching triac 47 controlled by chip 27, and through heater element 40 to ground. Triac 47 switches electrical power to heater element 40 and is directly controlled by the output U6 of chip 27 through output resistor R6.

Temperature sensor 44 is most preferably a thermistor with a negative temperature coefficient. As the temperature rises, the resistance of sensor 44 drops, causing the voltage at sensor input U3 of chip 27 to approach the reference voltage expressed at U1 of chip 27. Chip 27 is designed to vary its output signal at U6 depending on the value of the sensor voltage. When the iron is first turned on at room temperature, the voltage at sensor input U3 is such that the output U6 of chip 27 triggers triac 47 fully on. Then nearly all the power supplied by power supply 19 is available to heater element 40. As the iron heats up, the input voltage at U3 decreases and chip 27 generates a control signal that shuts off triac 47 for a portion of each power cycle. Preferably, triac 47 is switched at the alternating current ("AC") line zero crossing point to avoid transients induced by voltage spikes and achieve more dependable operation. The control signal is proportional to the difference between the temperature of the baseplate 10 and the desired set point temperature. Because of the proportional control signal provided by chip 27, the portion of power allowed through triac 47 decreases gradually as the temperature increases. As the temperature approaches the set point, chip 27 controls triac 47 so that just enough power is supplied to maintain the temperature at or slightly below the set point, thereby greatly reducing or eliminating ripples 23, as shown in FIG. 6.

Resistor R2 serves as a temperature setting means for setting the desired temperature of the iron. The basic function of the temperature setting means is to send a reference signal to chip 27 that represents the desired temperature of the iron. R2 is preferably a variable resistor that may be adjusted by the operator of the seaming iron, providing a temperature set point adjustment means. Increasing the resistance of R2 reduces the input voltage at U3 at a given temperature, in effect lowering the set point by causing chip 27 to reduce power flow through the triac. Decreasing the resistance of R2 has the opposite effect, raising the set point.

Indicator lamp 24 is an LED that remains on so long as power supply 19 is connected. Diode D2, C2, and R7 are for conditioning the power supplied to lamp 24 according to well understood methods. Indicator lamp 26 is also an LED that is on only when power is flowing through triac 47. Thus lamp 26 is on while the iron is heating. Resistances R4 and R5, diode D1, and capacitor C1 ensure the proper operation of chip 27 according to the manufacturer's recommendation, and are not directly involved in the operation of the circuit apart from the internal operation of the chip 27.

Operation

To use my iron, the operator connects the power cord 18 to an appropriate power source, such as a 120 volt outlet. Once connected, both indicator lamps 24, 26 are lit. The operator can then set the desired temperature by rotating control knob 16. When the iron reaches the desired temperature, indicator lamp 26 goes out, and the operator can use the iron to seam two abutting pieces of carpet. Because of the electronic temperature control, the operator will find my iron heats up more quickly and allows for better control of the adhesive temperature than the irons currently available. Thus, a skilled operator will be able to optimize the iron temperature for speed of operation and best quality. The operator will also obtain more consistent and uniform results with my iron because of the more repeatable and precise temperature control, and the elimination of temperature ripples 23.

To form a seam using my iron, the operator lifts the two abutting edges of carpet at one end of the seam. Grasping the handgrip 80, the operator places the bottom surface 58 of the baseplate 10 over the hot melt adhesive strip on the carpet seaming tape which has been centered along the seam line. The carpet backing rests upon the angled top surface of the heat shield 12. The operator then moves the carpet seaming iron from one end of the seam line to other in a slow, controlled fashion. As the operator moves the iron over the hot melt carpet seaming tape, the hot melt adhesive melts and is channeled through the grooves between ribs 66. The motion of the iron channels some of the hot melt adhesive into the 'V' groove 68, which feeds molten adhesive into the deep center groove 64. As the iron passes, the hot melt adhesive emerges from under the trailing edge 74 of the baseplate 10, and preferably forms an upstanding, central bead of molten adhesive. The carpet edges encounter the guide 22, which centers the iron between the edges. As the iron continues to move down the seam line, the carpet behind the iron falls back into abutting position, encountering the raised central bead, which coats the abutting edges with molten adhesive. In some cases, the operator will also push the carpet behind the trailing edge 74 down into the molten adhesive strip and into abutting relationship with each other to ensure a strong seam. The molten adhesive typically cures within tens of seconds.

During the seaming process, the transfer of heat from the baseplate 10 to the hot melt adhesive will cause the temperature of the baseplate 10 to drop. Even a slight drop in temperature is sensed almost immediately by the temperature sensor 44, causing an increase in power to the heating element 40 and turning on indicator lamp 26. As the baseplate 10 temperature returns to the set point, the power supplied to the heating element 40 will gradually be restricted. When the iron temperature reaches the setpoint, indicator lamp 26 will turn off.

As the operator continues to push the hot iron along the seam line, air is drawn into the area between the heat shield 12 and the baseplate 10 through the air inlets 20. As this air is heated by the baseplate 10, it rises through openings 78 in the top of the heat shield, through a conduit provided at the leading edge portion of the handle 14, and out through an outlet 70 which is positioned above the carpet being seamed. Thus, the carpet backing, which rests upon the heat shield during seaming, is kept relatively cool. The heat shield 12 and handle 14 are also cooled by the air flow. At the end of the seaming process, the operator can disconnect the power cord from the power source to allow the iron to cool down. Once this has been done, both indicator lamps 24, 26 will no longer be illuminated.

EXAMPLE

A carpet seaming iron, available from ORCON Corporation of Union City, Calif. under the trade name FEATHER-LITE TM, was disassembled. The thermostat, wiring and other electrical components were removed. A 100K NTC thermistor with an operating range of 0 to 450 degrees Fahrenheit was mounted securely to the top surface of the baseplate of the iron. The thermistor and heating element of the iron were connected to a prototype power control circuit. The power control circuit was constructed to provide simple zero-crossing triac control using a OM1654 chip available from Philips Semiconductors. Circuit components were selected so that the circuit would control a load of 600 Watts with a maximum set point of 420° F. and a proportional band of 10. The iron was reassembled. For convenience, the control circuit remained external to the handle. A thermocouple was attached to the bottom surface of the baseplate and connected through a suitable interface to a chart recorder. The iron was placed into a stand so that it was supported with its base horizontal in air. An unmodified FEATHERLITE TM iron was similarly prepared for testing for control purposes. When 120 VAC electrical power was supplied to the irons, both irons began warming at approximately the same rate, reflecting their identical heating systems. However, the control iron overshot its set point by approximately 70° F. and exhibited a constant ripple of about 50° F. trough-to-peak about its set point. In comparison, the modified iron with electronic control overshot its set point by approximately 50° F. and exhibited a constant ripple of less than 3° F. trough-to-peak about its set point. Thus the electronically controlled iron had less initial overshoot and much less temperature ripple than the conventionally controlled iron.

Accordingly, I have provided an electric carpet seaming iron that will heat rapidly, will maintain a steady temperature, will perform consistently and reliably, and will not overheat.

What is claimed is:

1. A carpet seaming iron including
   (a) a baseplate having a bottom surface and a top surface,
   (b) a heating element mounted to said baseplate,
   (b) a solid state temperature sensor positioned to sense the temperature of said baseplate,
   (d) an electronic control circuit inside said carpet seaming iron and operatively associated with said temperature sensor to control said heating element,
   (e) a heat shield mounted over said top surface of said baseplate, and
   (f) a handle for manipulating said baseplate;
   wherein said carpet seaming iron is configured for face seaming carpet, and wherein said heat shield is a non-metallic heat shield and is mounted to said baseplate, and wherein said handle is mounted to said non-metallic heat shield.

2. The carpet seaming iron of claim 1, further comprising an insulating gasket interposed between said heat shield and said baseplate.

3. The carpet seaming iron of claim 1, wherein said temperature sensor is a thermistor.

4. The carpet seaming iron of claim 3, wherein said thermistor is mounted inside a recess in said baseplate.

5. The carpet seaming iron of claim 1, wherein said electronic control circuit additionally comprises a temperature set point adjustment means for enabling an operator to heat the baseplate to a settable range of desired temperatures.

6. The carpet seaming iron of claim 5, wherein said temperature set point adjustment means comprises a variable resistor operatively associated with a control knob.

7. The carpet seaming iron of claim 1, further comprising a thermal fuse for shutting off electric power to the iron in case of failure of said electronic temperature control circuit.

8. The carpet seaming iron of claim 1, wherein said electronic temperature control circuit is mounted inside said handle.

9. The carpet seaming iron of claim 1, wherein said electronic temperature control circuit comprises a power controller chip for supplying a control signal that is proportional to the difference between the temperature of said baseplate and a desired temperature.

10. The carpet seaming iron of claim 1, wherein said electronic temperature control circuit comprises a power controller chip for power control and a triac for power switching.

11. The carpet seaming iron of claim 10, wherein said power controller chip switches said triac at the zero crossing point of an alternating current line.

12. The carpet seaming iron of claim 1, wherein said handle includes a guide tapering away from said base trailing end along an outer surface of said heat shield towards said trailing end of said baseplate, for guiding two abutting carpet pieces into a hot melt adhesive strip.

13. The carpet seaming iron of claim 1, wherein said heating element is cast inside said baseplate.

* * * * *